United States Patent
Jacobs et al.

(10) Patent No.: US 11,955,924 B2
(45) Date of Patent: Apr. 9, 2024

(54) SOLAR TRACKING MOUNTING SYSTEM

(71) Applicant: KLOECKNER METALS CORPORATION, Roswell, GA (US)

(72) Inventors: Jeremy Jacobs, Sacramento, CA (US); Mark Schroeder, Rancho Cordova, CA (US); Michael Fraenkel, Danville, CA (US); Christopher Lee Cruse, Orangevale, CA (US)

(73) Assignee: KLOECKNER METALS CORPORATION, Roswell, GA (US)

( * ) Notice: Subject to any disclaimer, the term of this patent is extended or adjusted under 35 U.S.C. 154(b) by 0 days.

(21) Appl. No.: 17/443,652

(22) Filed: Jul. 27, 2021

(65) Prior Publication Data

US 2022/0029576 A1 Jan. 27, 2022

Related U.S. Application Data

(60) Provisional application No. 63/056,864, filed on Jul. 27, 2020.

(51) Int. Cl.
| | |
|---|---|
| *H02S 20/32* | (2014.01) |
| *F16M 11/10* | (2006.01) |
| *F16M 11/18* | (2006.01) |
| *F16M 11/22* | (2006.01) |
| *F24S 25/70* | (2018.01) |
| *F24S 30/425* | (2018.01) |
| *G05D 3/12* | (2006.01) |
| *F24S 30/00* | (2018.01) |

(52) U.S. Cl.
CPC ............ *H02S 20/32* (2014.12); *F16M 11/10* (2013.01); *F16M 11/18* (2013.01); *F16M 11/22* (2013.01); *F24S 25/70* (2018.05); *F24S 30/425* (2018.05); *G05D 3/125* (2013.01); *F24S 2030/134* (2018.05); *F24S 2030/16* (2018.05)

(58) Field of Classification Search
None
See application file for complete search history.

(56) References Cited

U.S. PATENT DOCUMENTS

| | | |
|---|---|---|
| 8,378,610 B2 | 2/2013 | Jensen |
| 8,459,249 B2 | 6/2013 | Corio |
| 8,511,297 B2 | 8/2013 | McNeil-Yeckel et al. |

(Continued)

*Primary Examiner* — Steven M Marsh
(74) *Attorney, Agent, or Firm* — Troutman Pepper Hamilton Sanders LLP; James E. Schutz; Matthew J. Esserman

(57) ABSTRACT

A solar tracking mounting system is provided. The tracking system has an anchor comprising a pile and a riser bracket fastened to the top thereof, wherein the riser bracket is configured to provide adjustable mounting points, a chord assembly coupled to with the riser brackets, wherein the chord assembly is configured to pivotability tilt, a kicker connected to the anchor assembly, wherein the kicker is configured to connect the chord assembly to the pile, a vertical actuator connected to the kicker and the chord assembly, wherein the vertical actuator is a rack and pinion linear actuator configured to amplify a torque received from a motor and pivotably tilt to the chord assembly to a desired angle while tracking a direction of a light source, and a driveshaft connected to the motor and the vertical actuator. A jack screw may also be provided therein for actuation.

20 Claims, 14 Drawing Sheets

(56) References Cited

U.S. PATENT DOCUMENTS

| | | |
|---|---|---|
| 8,916,811 B2 | 12/2014 | Miller et al. |
| 9,503,016 B2 | 11/2016 | Sakai et al. |
| 9,618,016 B2 | 4/2017 | Heusser et al. |
| 9,905,717 B2 | 2/2018 | Au |
| 9,954,481 B2 | 4/2018 | Huang |
| 10,415,853 B2 | 9/2019 | Habdank |
| 10,514,185 B2 | 12/2019 | Ingram |
| 10,778,140 B2 | 9/2020 | Lopez Ona et al. |
| 2008/0308091 A1* | 12/2008 | Corio ............... F24S 30/425 126/606 |
| 2010/0043776 A1* | 2/2010 | Gee .................. F24S 50/00 126/571 |
| 2010/0229852 A1* | 9/2010 | Buckley ........... F24S 30/425 126/696 |
| 2010/0288062 A1 | 11/2010 | Meyer |
| 2011/0041834 A1 | 2/2011 | Liao |
| 2011/0240006 A1* | 10/2011 | Linke ............... H02S 20/32 126/600 |
| 2015/0144178 A1 | 5/2015 | Sakai et al. |
| 2019/0052224 A1 | 2/2019 | Schatz et al. |
| 2019/0158017 A1 | 5/2019 | Hu |
| 2019/0296686 A1 | 9/2019 | Kresse et al. |
| 2020/0052643 A1* | 2/2020 | Ballentine ......... F16M 11/10 |
| 2020/0076355 A1* | 3/2020 | Hudson ............. F24S 25/70 |
| 2020/0195191 A1 | 6/2020 | Melton et al. |

* cited by examiner

SOLAR TRACKING MOUNTING SYSTEM

CROSS-REFERENCE TO RELATED APPLICATIONS

This application claims the benefit of U.S. Provisional Patent Application Ser. No. 63/056,864 filed Jul. 27, 2020, entitled Solar Tracking Mounting System the entire contents of which are incorporated by reference herein for all purposes.

FIELD OF THE INVENTION

The present invention generally relates to mounting systems. More specifically, the present invention relates to a solar mounting system that track the movement of the sun by varying tilt angles throughout the day to increase the energy output because the solar panels receive the most possible exposure.

BACKGROUND

Renewable energy sources are increasingly seen as the solution to meeting growing energy demands while reducing greenhouse gas emissions and dependence on fossil fuels. Solar energy is a viable solution to meeting the ever-increasing demand for energy. The use of solar cells or photovoltaic cells is one method of harnessing the sun's energy. The solar cell is a device that converts light energy into electrical energy by the photovoltaic effect.

In solar energy systems, efficiency is an important aspect of the useful energy output of the system. For example, commercial PV cells typically have less than 20% conversion efficiency of incident solar energy. Other factors affecting solar energy generation include the amount of incident solar energy at the installation site and incident angle of solar radiation on the solar energy system. To increase efficiency, it is known to orient a solar energy device in the direction of maximum exposure to the sun's energy throughout the day. This orientation control, known as solar tracking, can increase the energy output throughout a day over a fixed orientation solar energy device.

Conventional solar tracking systems rely upon the use of a centralized tube system to rotate the solar panel about a drive axis. These tubes experience torsional effects that may destabilize the mounting system. As a result, components such as dampers and heavier structural components are required to maintain the system rigidity and stability. These factors increase costs and system risk. Further, complex software and sensor systems often require these trackers to move to a load-optimized tilt angle (stow angle) during under load. This compromises system power generation and could be unreliable and result in structural system failure if the sensor system does not operate as intended.

In light of the above-mentioned problems, there is a need for a solar racking system that tracks the direction of the sun by varying the tilt angle throughout the day to increase the energy output. Also, there is a need for a more rigid and more stable tracking system.

SUMMARY OF THE INVENTION

The present invention generally discloses mounting systems. Further, the present invention discloses a tracking solar mounting system that tracks the movement of the sun by varying tilt angles throughout the day to increase the energy output.

In one embodiment, the system comprises at least one, but in embodiments, a pair of anchor assemblies. Each anchor assembly comprises a pile, foundation, footing, ballast, ground/earth screw, riser bracket, bearing assembly, or a pile cap. In one embodiment, the pile is a roll-formed or hot-rolled structural pile. The pile is fixed to the ground via any anchoring method. In one embodiment, the riser bracket comprises one or more components fastened to the top of the pile, wherein the riser bracket provides adjustment of system mounting points in various directions (e.g., vertical, horizontal and polar axis).

In one embodiment, the system comprises at least one, but in embodiments, a pair of chord assemblies (e.g., a rafter, top chord, a north-south support member, a post frame, a rack frame, rocker or a pivot beam/arm). Each chord assembly comprises a beam and bracket assembly. In one embodiment, the chord assembly is mounted to the riser bracket using one or more fasteners and is pivotably titled to a desired angle while tracking the direction of the sun. In one embodiment, the system further comprises a kicker, angle brace, rafter support, strut or brace for each anchor assembly. In one embodiment, the kicker is a fixed length axially loaded strut. The kicker connects the chord assembly to the pile via a vertical lifting system (i.e., vertical actuator) or rack and pinion gearbox assembly. In embodiments, vertical actuation occurs utilizing the fixed strut.

In an embodiment, a solar tracking mounting system is provided. The tracking system comprises an anchor having a pile and a riser bracket fastened to the top thereof, wherein the riser bracket is configured to provide adjustable mounting points, a chord assembly coupled to with the riser brackets, wherein the chord assembly is configured to pivotably tilt, a kicker connected to the anchor assembly, wherein the kicker is configured to connect the chord assembly to the pile, a vertical actuator connected to the kicker and the chord assembly, wherein the vertical actuator is a rack and pinion linear actuator configured to amplify a torque received from a motor and pivotably tilt to the chord assembly to a desired angle while tracking a direction of a light source, and a driveshaft connected to the motor and the vertical actuator.

In embodiments, a solar tracking mounting system is provided. The tracking mounting system comprises an anchor comprising a pile and a riser bracket fastened to the top thereof, wherein the riser bracket is configured to provide adjustable mounting points, a chord assembly coupled to with the riser brackets, wherein the chord assembly is configured to pivotably tit, a kicker connected to the anchor assembly, wherein the kicker is configured to connect the chord assembly to the pile, a vertical actuator connected to the kicker and the chord assembly, wherein the vertical actuator is a jack screw configured to pivotably tilt to the chord assembly to a desired angle while tracking a direction of a light source, a driveshaft connected to the motor and the vertical actuator.

In one embodiment, the system further comprises a purlin assembly having one or more purlins, support beams, rails or and one or more purlin hooks. The purlins and purlin hooks mount a plurality of solar panels to the chord assembly via bolting or clamping methods. The chord assembly provides structural mounting support to the purlins and upper kicker connection. In one embodiment, the chord assembly is fastened to the purlins via self-drilling screws and bolts. The self-drilling screws allow for faster installation and high tolerance to variations in pile location without the need for mating holes in the purlin. In one embodiment, the purlin assembly provides structural support between the piles and the purlin and purlin hook are constructed of formed steel or aluminum.

In one embodiment, the system further comprises a driveshaft (or driveline) assembly. The driveshaft assembly comprises one or more motors, a geared vertical lifting system or pinion gearbox assembly, and a driveshaft. In one embodiment, each row of the system comprises a dedicated motor, though one motor may actuate all rows in embodiments. In one embodiment, the motor is a brushed or brushless motor powered by a system controller. The motor is powered by the controller and spins the driveshaft to generate torque and transmit the torque as an input to a pinion gearbox assembly. In one embodiment, the motor is provided with a waterproof enclosure.

In one embodiment, the pinion gearbox assembly amplifies the torque received from the motor and maintains the kicker position. The pinion gearbox assembly when actuated, along with the rack gear in a vertical direction, enable the control system to tilt the chord assembly to a desired direction.

In one embodiment, the system further comprises an insertion rail system, a fixed jack screw lift assembly, and a guide rail. In one embodiment, the insertion rail system is a clamping mounting rail that eliminates the need for approximately half of the module mounting fasteners. The fixed jack screw lift assembly is mechanically linked and driven via single row motor and driveshaft. In one embodiment, the fixed jack screw lift assembly lifts the mounting point of the kicker along the guide rail for kicker connection to rotate the system to the desired direction.

In another embodiment, the system further comprises a translating jack screw lift assembly. The translating jack screw lift assembly is mechanically linked and driven via single row motor and driveshaft. The translating jack screw lift assembly lifts the mounting point along the guide rail for kicker connection to rotate the system to a desired angle.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

Figure 1:
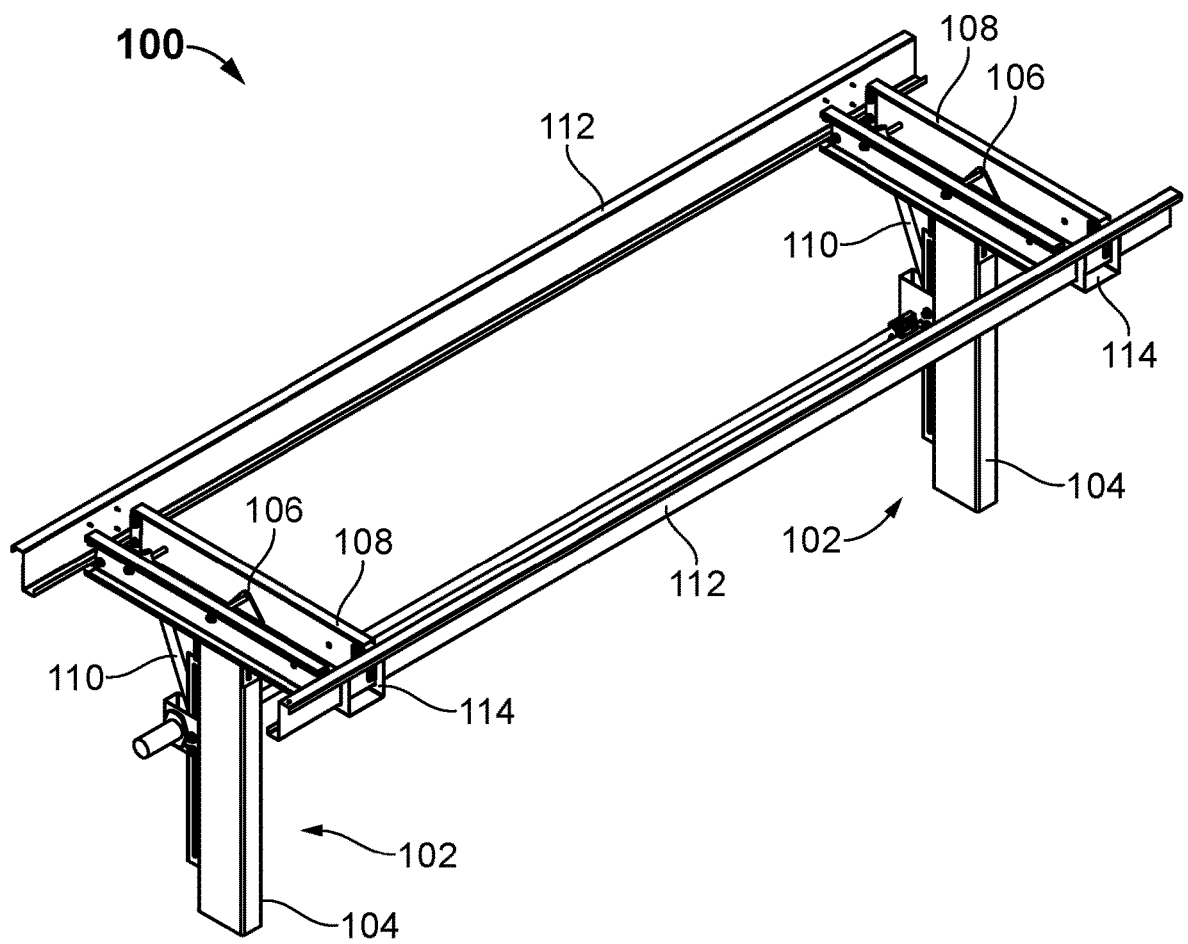
FIG. 1 shows a top perspective view of a sun tracking solar mounting system in an embodiment of the present invention.

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Embodiments of the system are discussed below with reference to the examples. However, those skilled in the art will readily appreciate that the detailed description given herein with respect to these examples is for explanatory purposes as the system extends beyond these limited embodiments. For example, it should be appreciated that those skilled in the art will, in light of the teachings of the present system, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the system that are too numerous to be listed but that all fit within the scope of the system. Also, singular words should be read as plural and vice versa and masculine as feminine and vice versa, where appropriate, and alternative embodiments do not necessarily imply that the two are mutually exclusive.

It is to be further understood that the present system is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present system. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and sub-servient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this system belongs. Preferred methods, techniques, devices, and materials are described, although any methods, techniques, devices, or materials similar or equivalent to those described herein may be used in the practice or testing of the present system.

Referring to FIG. 1, a top perspective view of a solar tracking solar mounting system (hereinafter referred as system) 100, according to one embodiment of the present invention is shown. In one embodiment, the system 100 comprises a pair of anchor assemblies 102. Each anchor assembly 102 comprises a pile (or a foundation, pier, footing, ballast, anchor or a ground/earth screw or a platform 104 and a riser bracket or a bearing assembly or an adjustment bracket/plate/assembly or a pile cap or a bearing tube/housing 106. In one embodiment, the pile 104 is a roll-formed or hot-rolled structural pile. The pile 104 is fixed to the ground via driving or other anchoring methods. In one embodiment, the riser bracket 106 comprises one or more components fastened to the top of the pile 104. In operation, the riser bracket 106 configured to provide adjustment of system mounting points in various directions such as vertical, horizontal, and polar axes.

The system 100 further comprises a pair of chord assemblies 108, rafter, top chord, a north-south support member, post frame, rack frame, rocker or a pivot beam/arm 108. Each chord assembly 108 comprises a beam and bracket assembly. In one embodiment, the chord assembly 108 is mounted to the riser bracket 106 using one or more fasteners. The chord assembly 108 is pivotably titled to a desired direction while tracking the direction of the sun. The system 100 further comprises a kicker (or angle brace, rafter support, strut, or brace) 110 for each anchor assembly 102. The kicker 110 is a fixed length axially loaded strut. The kicker 110 connects the chord assembly 108 to the pile 104 via a vertical lifting system or pinion gearbox assembly 120.

The system 100 further comprises a purlin assembly having one or more purlins or module rail 112 and one or more purlin hooks 114. The purlins 112 and purlin hooks 114 mount a plurality of solar panels 140 (as shown in FIG. 3) to the chord assembly 108 via bolting or clamping methods. The chord assembly 108 provides structural mounting support to the purlins 112 and upper kicker connection. In one embodiment, the chord assembly 108 is fastened to the purlins 112 via self-drilling screws and bolts. The self-drilling screws allow for faster installation and high tolerance to variations in pile location without the need of mating holes in the purlin 112. In one embodiment, the purlin assembly provides structural support between the piles 104. The purlin 112 and purlin hook 114 are constructed of formed steel or aluminum. In one embodiment, the system 100 further comprises a driveline/driveshaft assembly described in greater detail with relation to FIG. 2 and FIG. 3.

Figure 2:
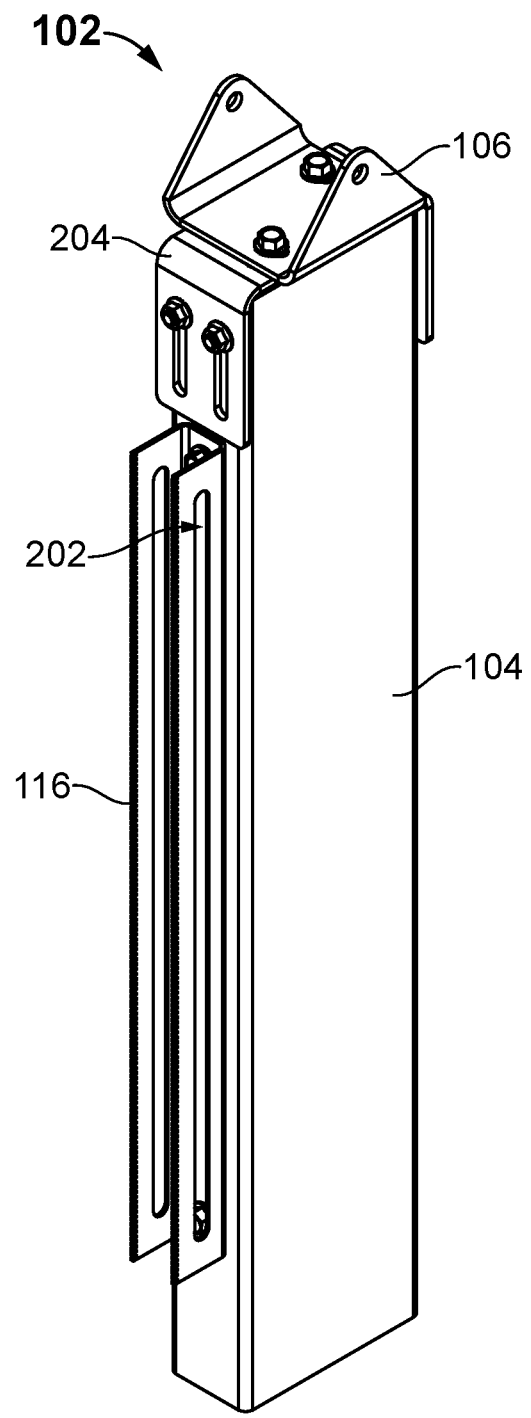
FIG. 2 shows a perspective view of a riser assembly of the system in one embodiment of the present invention.
Figure 3:
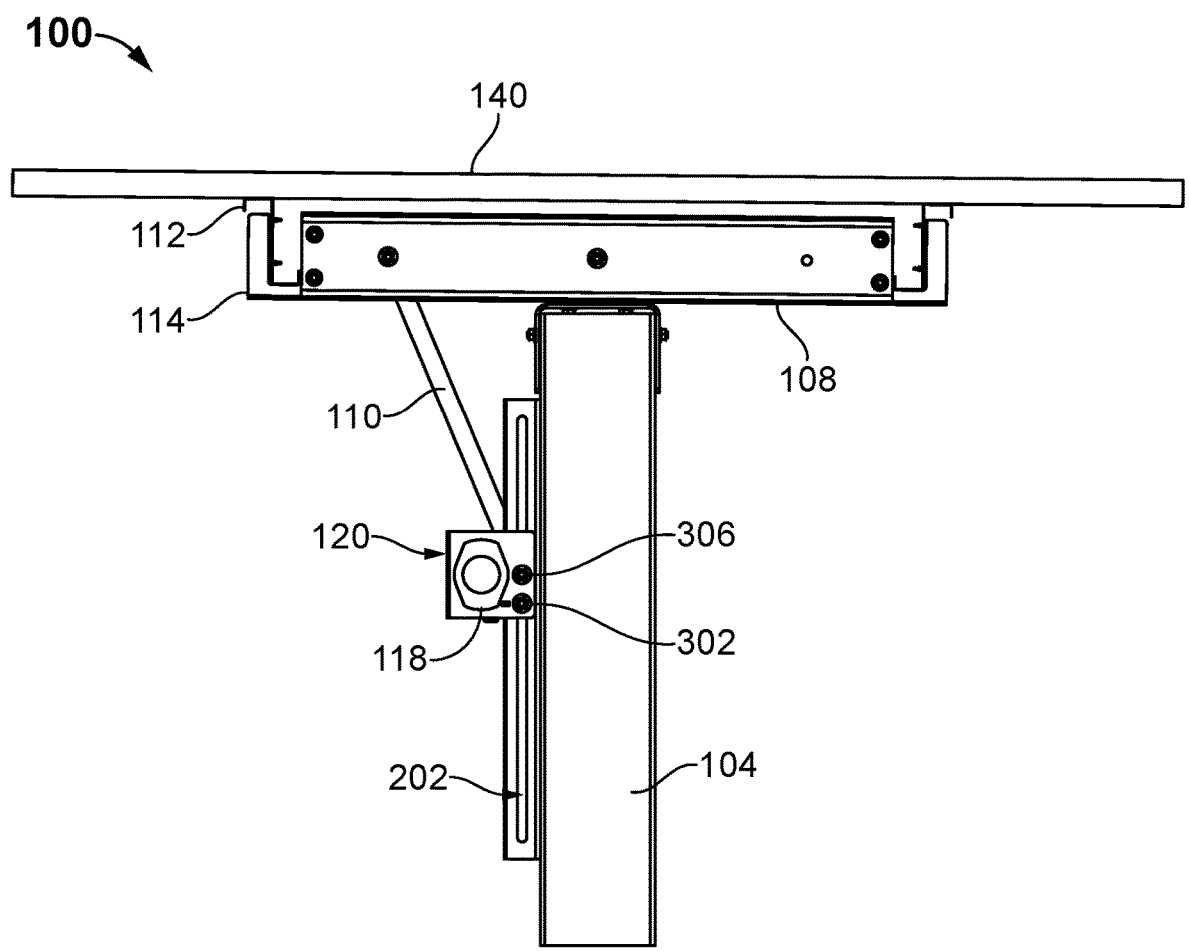
FIG. 3 shows a side view of the system in one embodiment of the present invention.

Referring to FIG. 2, a perspective view of the anchor assembly 102, according to one embodiment of the present invention. The anchor assembly 102 comprises a pile 104 and a riser bracket 106. In one embodiment, the pile 104 is a roll-formed or hot-rolled structural pile. The pile 104 is further coated to avoid any corrosion. The pile 104 is fixed to the ground via driving or other anchoring methods. In one embodiment, the riser bracket 106 comprises one or more components fastened to the top of the pile 104. In one embodiment, the riser bracket 106 is a structural formed plate assembly configured to provide a pivot point for chord assembly 108. Also, the riser bracket 106 allows for installation adjustment in any angle such as vertical, horizontal, and polar axes to align the system row. In one embodiment, the anchor assembly 102 further comprises a rack gear 116 fixed to the pile 104. The rack gear 116 may be a male or female vertical gear, which may be toothed or punched as shown at slot 202 to accept the mating pinion gear. In embodiments, the rack gear 116 is made from any one of steel, aluminum, plastic, or other suitable durable material and is highly corrosion resistance. The rack gear 116 is a structural member which linearly guides the pinion gear in a vertical motion. Furthermore, cap 204 is provided attached to the pile 104 to mate it with other components.

Figure 4:
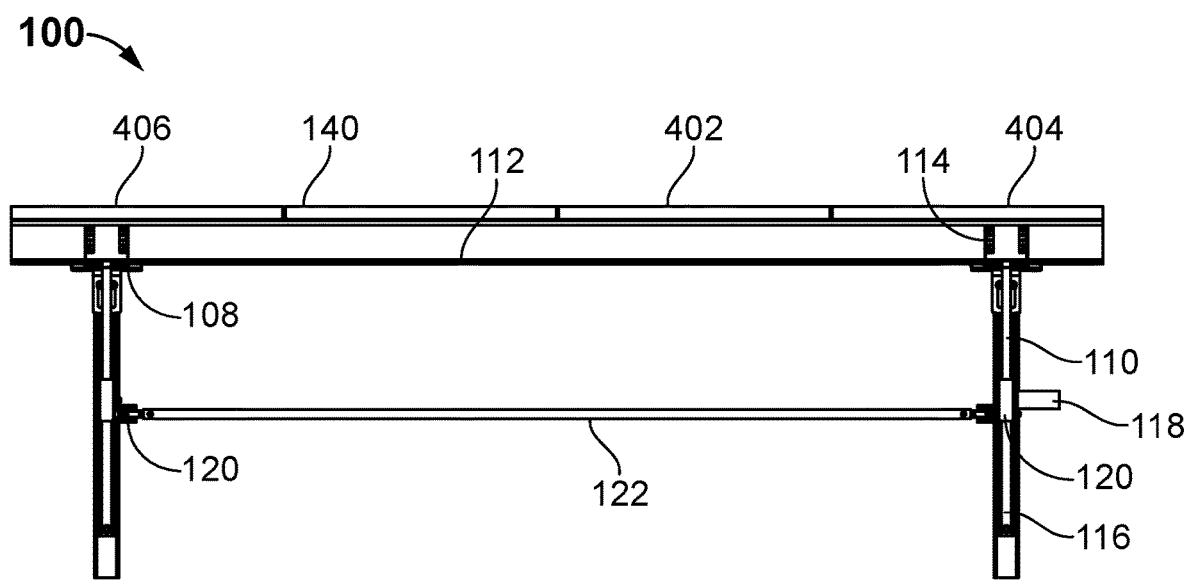
FIG. 4 shows a front view of the system in one embodiment of the present invention.

Referring to FIGS. 3 and 4, a side view and a front view of the solar mounting system 100 respectively is shown. The system 100 comprises a pair of anchor assemblies 102, a pair of chord assemblies 108, a kicker 110, a purlin 112, a hook 114, and a driveline/driveshaft assembly. Each anchor assembly 102 comprises a pile 104 and a riser bracket 106. Each chord assembly 108 has a beam and bracket for mounting to the riser bracket 106 using one or more fasteners. In one embodiment, the chord assembly 108 is pivotably titled to a desired direction while tracking the direction of the sun. In one embodiment, the kicker 110 is a rigid strut, which supports the chord assembly 108. The kicker 110 provides structural integrity to the system 100 and connects the chord assembly 108 to the pile 104 via a vertical lifting system.

In one embodiment, the purlin 112 is a structural beam. In one embodiment, the purlin 112 is configured in the shape of Z or C profile. The purlin 112 is fastened to the chord assembly 108 via fasteners which may be one or more self-drilling screws or bolts. The purlin 112 allows improved flexible connection in pile-to-pile. In one embodiment, the purlin hook 114 is a structural bracket that supports purlin 112 and fastens to the chord assembly 108.

In one embodiment, the driveshaft assembly comprises one or more motors 118, a geared vertical lifting system or pinion gearbox assembly 120 with pins being shown at 302 and 306, and a driveshaft 122. In one embodiment, each row of the system 100 comprises a motor 118 and is powered by the controller and spins the driveshaft 122. The torque generated by the motor 118 is transmitted as input to the pinion gearbox assembly 120. In one embodiment, the motor 118 is provided with a waterproof enclosure.

Each motor 118 of the system 100 is electronically or wirelessly coupled to a controller. The controller is a control box that is powered either by an additional solar panel on the tracker or is hardwired in from an outside source. The controller has one or two on-board batteries that power the controller PCB and motor. In one embodiment, the controller could be directly connected to the motor 118 via a wiring harness/cable/connector. In one embodiment, the controller is responsible for implementing the tracking schedule via an internal tilt sensor, including "backtracking" to reduce module shading and energy loss (e.g, tilts at specific angles in the morning/evening so there's no shade). In one embodiment, the controllers wirelessly communicate with each other and any weather/wind/flood sensors on the project site. For example, if the sensors detect predetermined wind speed, the tracker controllers tilt the site flat to lower wind effects.

The pinion gearbox assembly 120 amplifies the toque received from the motor 120 and maintains the kicker position. In one embodiment, the pinion gearbox assembly 120 actuates along with the rack gear 116 in a vertical direction, which enables the control system to tilt the chord assembly to the desired direction. In this way, the kicker 110 is pinned to the pinion gearbox assembly 120 and chord assembly 108. In operation, when the kicker 110 is paired with the pinion gearbox assembly 120, it allows for a structural connection at any tilt angle without the need for any environmental stow angle.

In one embodiment, the driveshaft 122 is a torsionally stable beam or pipe. The driveshaft 122 is configured to transfer the torque from input motor 118 to geared vertical lifting system or pinion gearbox assembly 120 at each pile 104. In one embodiment, the driveshaft 122 is hinged to allow for installation at varying grade approach angles. The driveshaft 122 may extend or overlap as needed to allow for foundation span tolerances.

In operation, the pinion gearbox assembly 120 amplifies the torque from the motor 118 and driveshaft 122 via a gear-reduction system such as a gearbox. The system 100 actuates vertically along the guide rail 128 (shown in FIG. 7) via a rack and pinion 120 or threaded rod screw jack system 126. Both gearing mechanisms hold the vertical position of the kicker mounting point when the motor 118 is not running. The lifting system provides a stable connection point for the fixed length kicker 110 to transfer the load to the pile even in the event of failure of the input drive system. The vertical lifting system vertically moves up and down with the driveline/driveshaft 122 as the system 100 tracks the sun. In one embodiment, the structural configuration transfers the load from the fixed length kicker 110 to the pile 104 via a distributed load rather than a point load. The load is distributed from the contact surface between the guide rail 128 and the pile 104. The distributed loads are beneficial for the pile design when compared to the point load. The guide rail 128 allows distribution of load with over two feet of contact length. Additional panels 402, 404 and 406 are shown as well attached to the rack.

Figure 5:
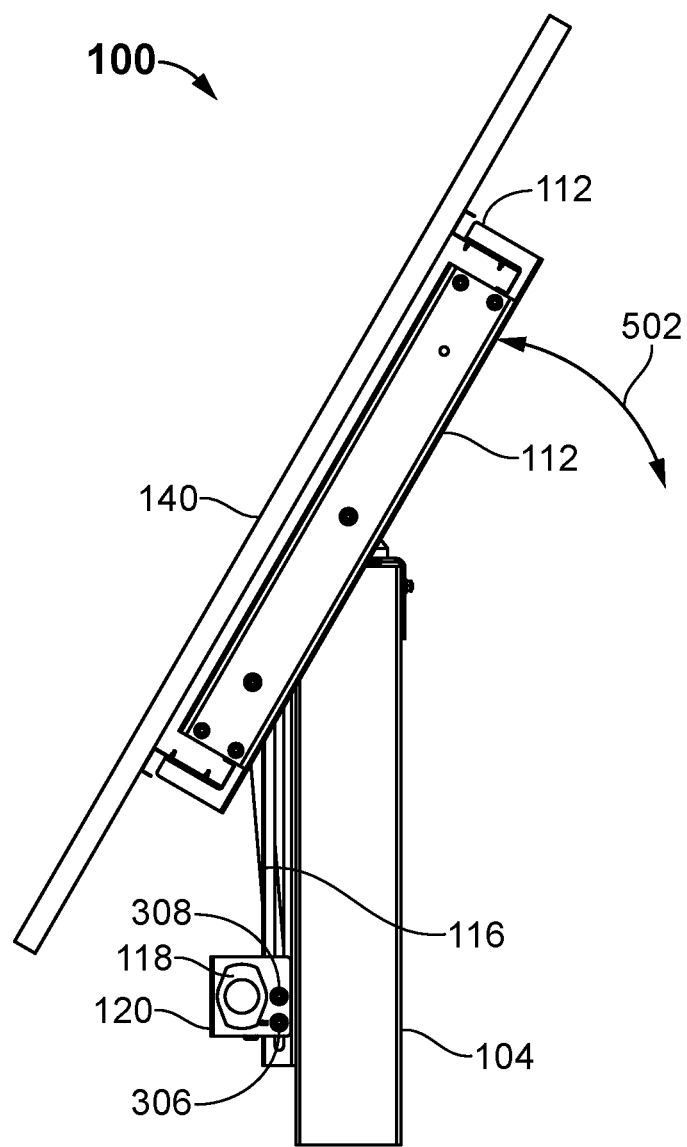
FIG. 5 shows a perspective view of the system tilted to one side in one embodiment of the present invention.
Figure 6:
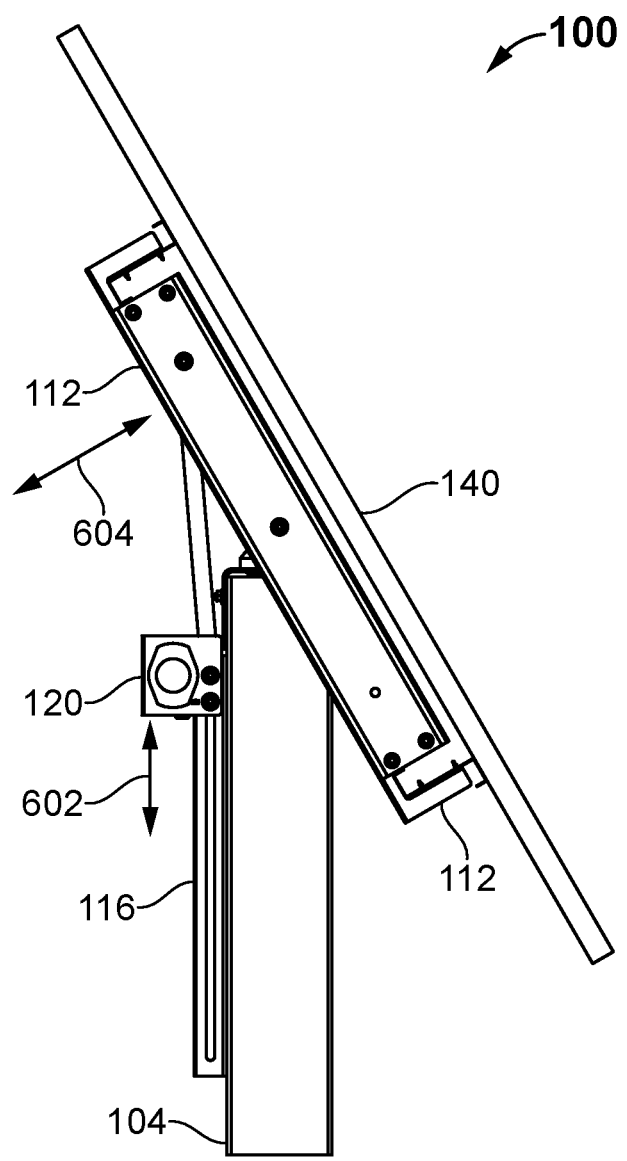
FIG. 6 shows a perspective view of the system tilted to another side in one embodiment of the present invention.

Referring to FIGS. 5 and 6, a perspective view of the system 100 tilted on various sides, according to one embodiment of the present invention. The system 100 comprises a plurality of solar panels 140 mounted on the chord assembly 108. The chord assembly 108 is tilted to a desired direction to increase the energy output to about 20% throughout the day. In operation, the solar panels 140 are tilted by raising or lowering the mounting point of the kicker 110 to the pile 104 via the rack gear 116 using rack and pinion gearbox assembly 120 (also referred to as pinion gear box) such that the rack tilts according to arrow 502 and rack gear 116 and rack and pinion gearbox 120 move according to arrow 602. The mounting point of the kicker 110 alters the tilt angle of the system 100 to track the sun as shown at arrow 604 In one embodiment, the system 100 tilt/rotate to about +/−60 degrees while maintaining structural integrity and stability. In one embodiment, tracking a fixed tilt may increase natural frequency by eliminating typical tracker failure events such as torsional galloping without the need of additional dampers. In one embodiment, the driveshaft 122 simplicity reduces the cost and minimizes the operation and maintenance costs.

Figure 7:
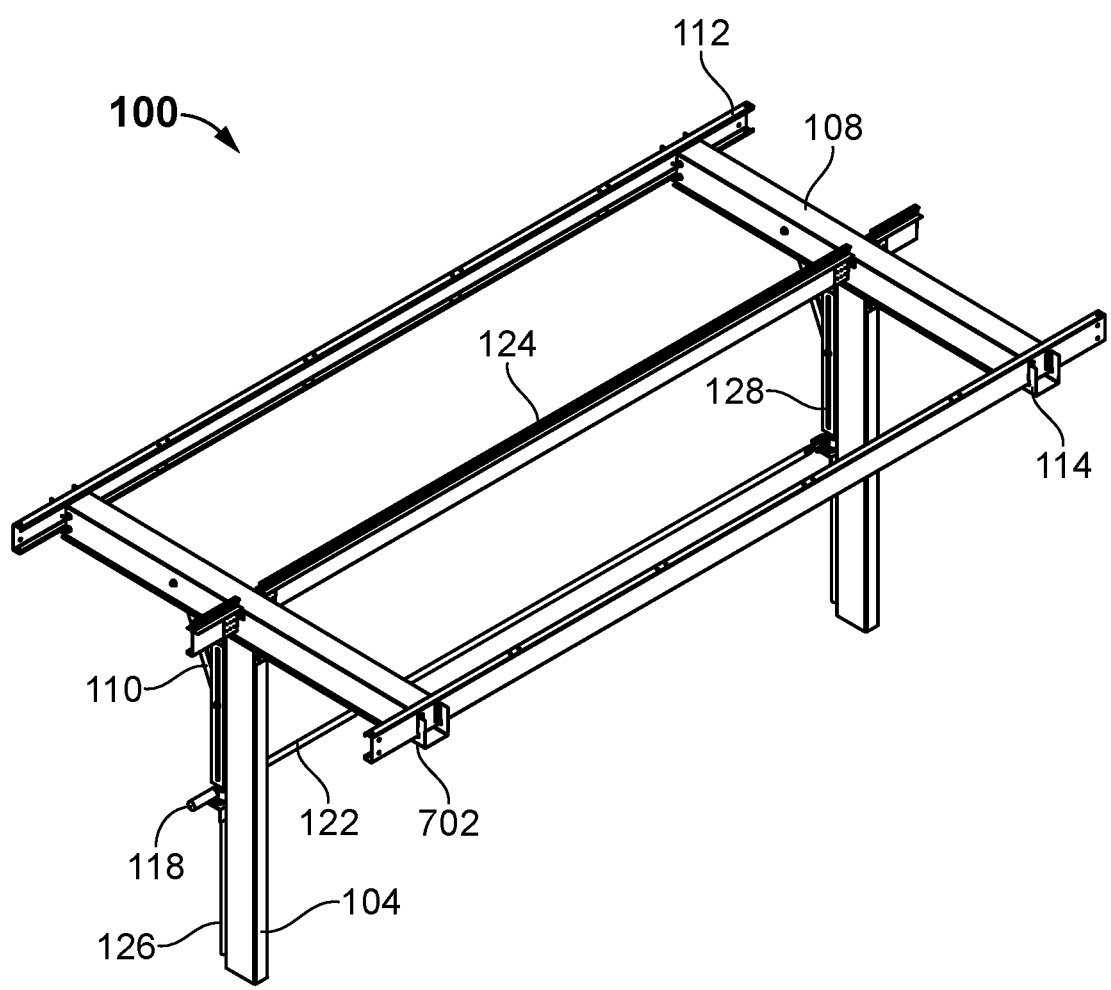
FIG. 7 shows a top perspective view of the mounting system in another embodiment of the present invention.

Referring to FIG. 7, a top perspective view of the mounting system 100, according to another embodiment of the present invention. In one embodiment, the system 100 comprises a pair of chord assembly 108. Each chord assembly 108 has a beam and bracket assembly. The system 100 further comprises a kicker 110 that connects the chord assembly 108 to the pile 104 via a vertical lifting system. The system 100 further comprises a purlin assembly having one or more purlins 112 and one or more purlin hook 114. The purlins 112 and purlin hooks 114 mount a plurality of solar panels 140 to the chord assembly 108. In one embodiment, the system 100 further comprises the driveshaft assembly. In one embodiment, the driveshaft assembly comprises one or more motors 118 and a driveshaft 122. In one embodiment, the system 100 further comprises an insertion rail system 124 and a fixed jack screw lift assembly 126. The cut-out portion of the purlin hook 114 is shown at 702.

Figure 8:
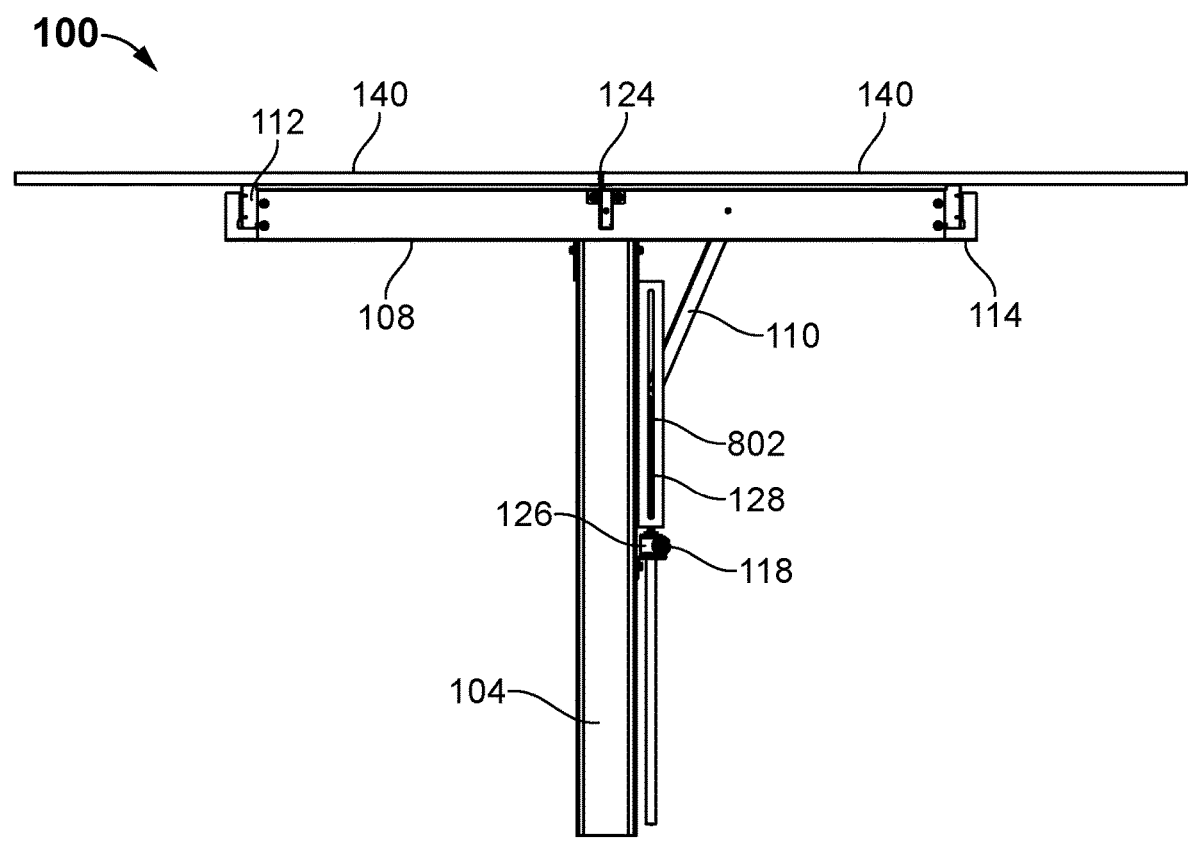
FIG. 8 shows a side view of the system in another embodiment of the present invention.
Figure 9:
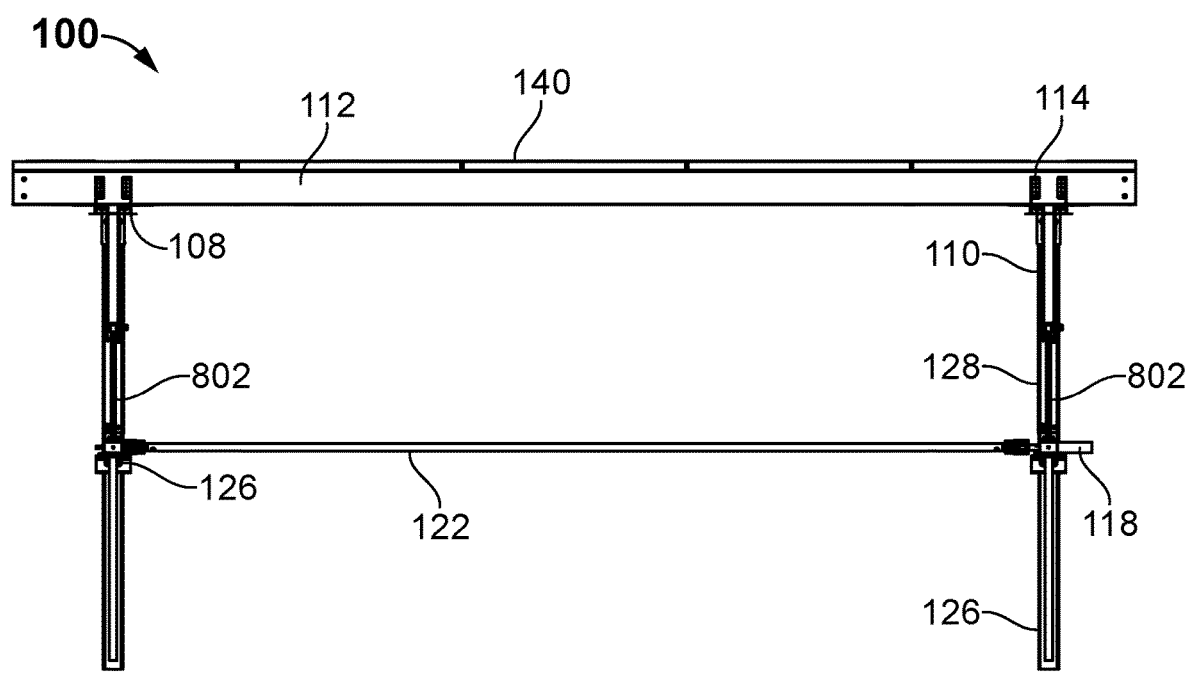
FIG. 9 shows a front view of the system in another embodiment of the present invention.

Referring to FIGS. 8 and 9, a side view and a front view of the system 100 respectively is shown. In one embodiment, the system 100 has two portrait configurations includes two-high module mounting configuration and fewer piles/drive assemblies per module, which is cost-effective. The system 100 comprises a pair of chord assembly 108, a kicker 110, a purlin assembly having one or more purlins 112 and one or more purlin hook 114, one or more motors 118, a driveshaft 122, an insertion rail system 124, a fixed jack screw lift assembly 126 (rather than rack and pinion), and a guide rail 128 having a threaded engagement 802.

In one embodiment, the driveshaft 122 is a torsionally stable beam or pipe, which transfers torque from input motor 118 to pinion gearbox assembly 120 at each pile 104. The driveshaft 122 is hinged to allow for installation at varying grade approach angles. In one embodiment, the driveshaft 122 could extend and overlap as needed to allow for the pile 104 span tolerances.

In an embodiment, the insertion rail system 124 is a clamping mounting rail. The insertion rail system 124 eliminates the need for approximately half of the module mounting fasteners. The insertion rail system 124 clamps two purlins 112 in place at the center span of chord assembly 108. Further, it is a rapid low-cost module installation procedure. In one embodiment, the fixed jack screw lift assembly 126 is fixed to each pile 104. The fixed jack screw lift assembly 126 is mechanically linked and driven via single row motor 118 and driveshaft 122. In one embodiment, the fixed jack screw lift assembly 126 lifts the mounting point of the kicker 110 along the guide rail 128 for kicker connection to rotate the system 100 to the desired direction.

Figure 10:
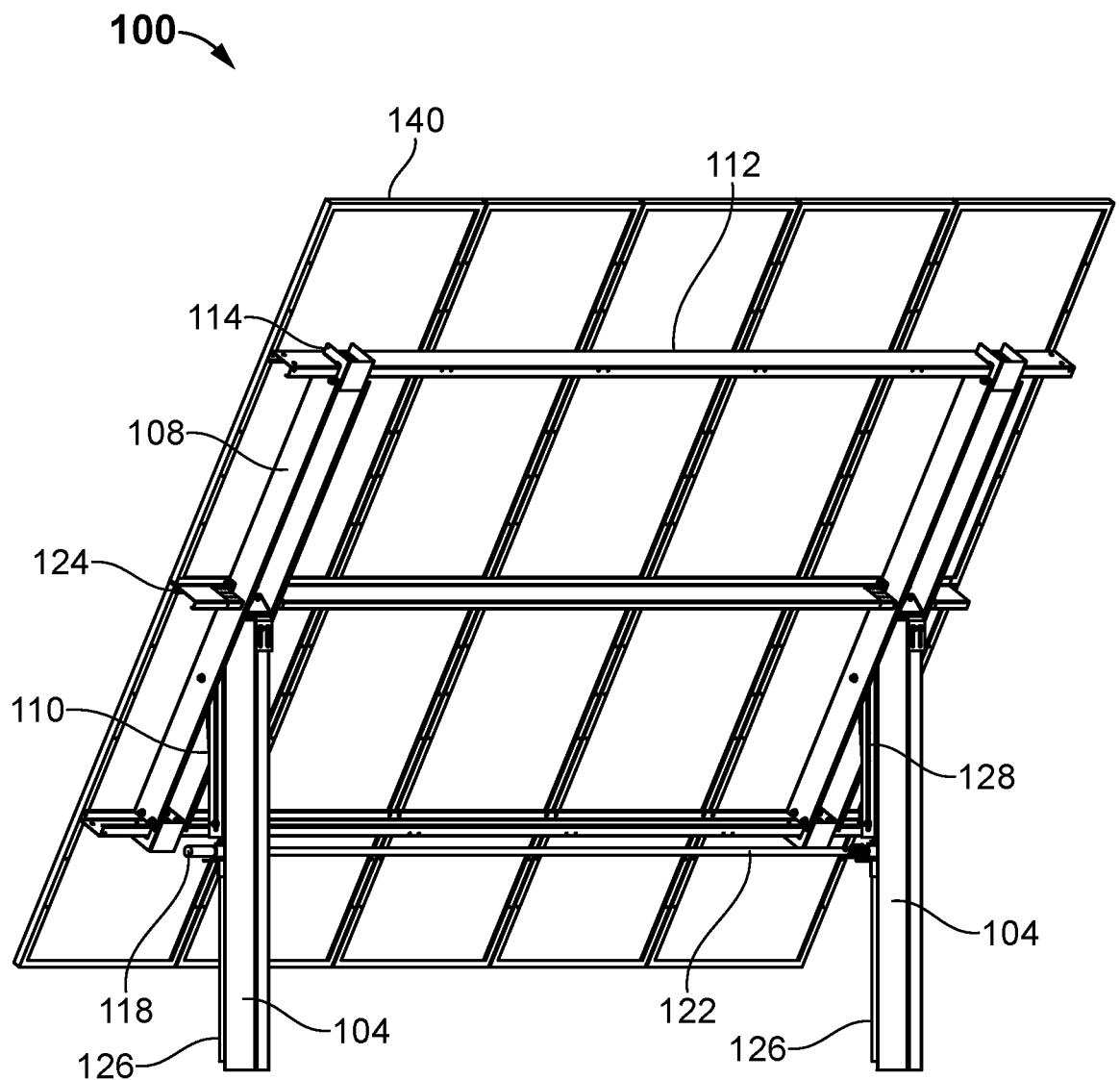
FIG. 10 shows a perspective view of the system tilted to certain angle in another embodiment of the present invention.

In one embodiment, the fixed jack screw lift assembly 126 is fixed to the pile 104. The jack screw lift assembly 126 is generally a motor/drive shaft lift that is bolted to a bracket that is also connected to the kicker 110. The jack screw lift assembly 126 is an bolted to a bracket/mounting platform for the kicker 110. As the motor 118 turns the jack screw lift assembly 126, the assembly moves up and down along the threaded rod. The jack screw lift assembly 126 is static/stable when not being powered. This means the assembly platform is a fixed point even if it loses power. By moving the kicker mounting point up and down the pile 104 and chord assembly 108 rotates about the bearing assembly pinpoint. This is because the kicker 110 is a fixed length and by altering the "triangle". FIG. 10 exemplarily illustrates a perspective view of the system 100 mounted with a plurality of solar panels 140 tilted to a certain angle using fixed jack screw lift assembly 126, according to another embodiment of the present invention.

Figure 11:
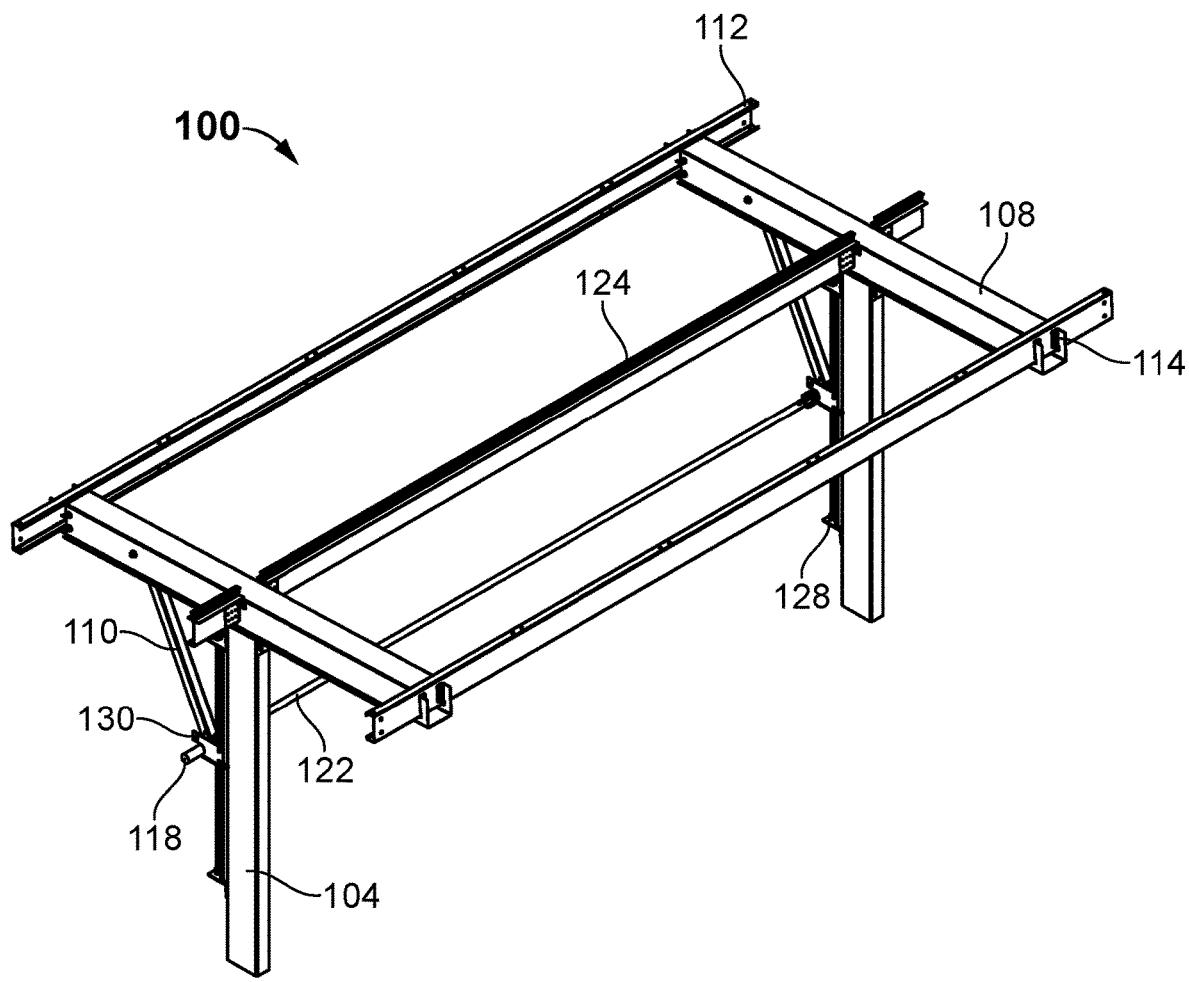
FIG. 11 shows a top perspective view of the system in yet another embodiment of the present invention.

Referring to FIG. 11, a top perspective view of the system 100 is shown. The system 100 comprises a pair of chord assembly 108. Each chord assembly 108 has a beam and bracket assembly. In one embodiment, the system 100 further comprises a kicker 110 that connects the chord assembly 108 to the pile 104 via a vertical lifting system. In one embodiment, the system 100 further comprises a purlin assembly having one or more purlins 112 and one or more purlin hook 114. The purlins 112 and purlin hooks 114 mount a plurality of solar panels 140 to the chord assembly 108. In one embodiment, the system 100 further comprises the driveshaft assembly. In one embodiment, the driveshaft assembly comprises one or more motors 118 and a driveshaft 122. In one embodiment, the system 100 further comprises an insertion rail system 124 and a translating jack screw lift 130.

Figure 12:
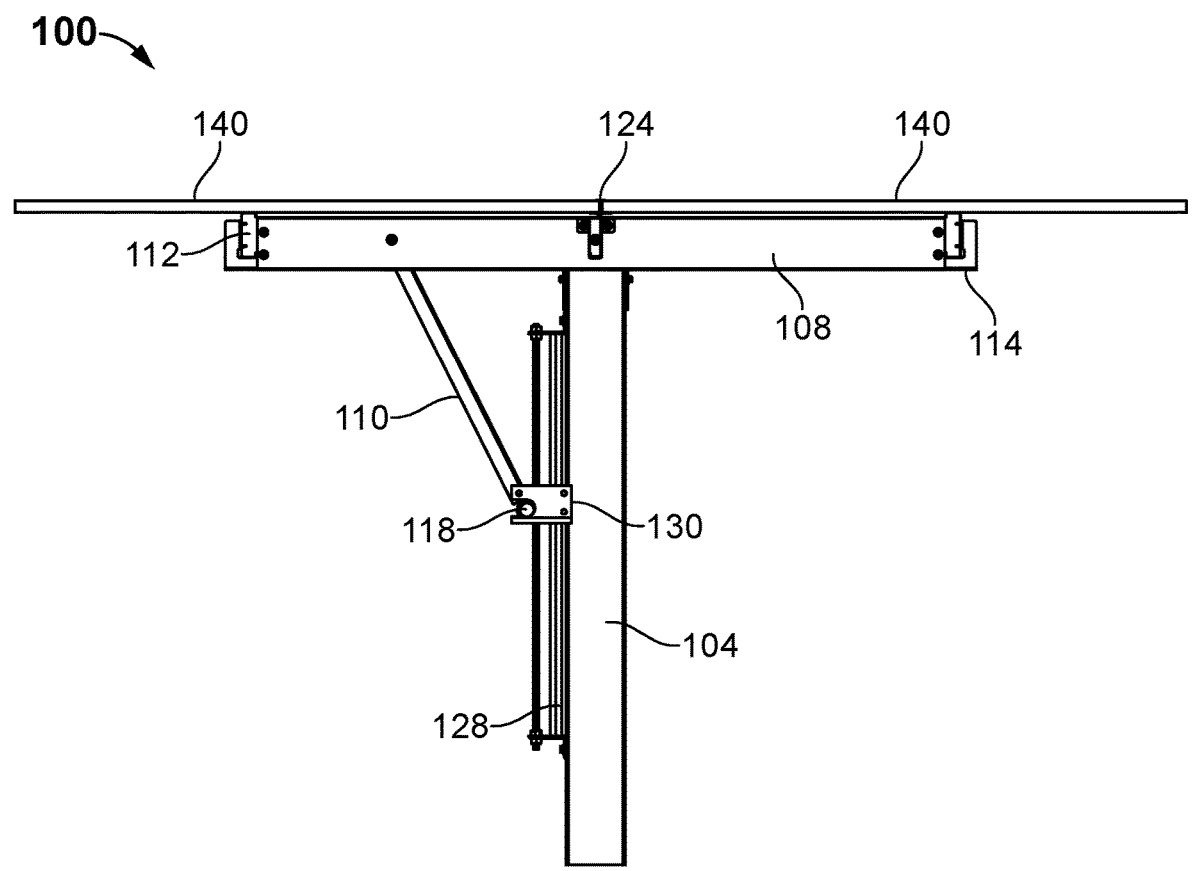
FIG. 12 shows a side view of the system in yet another embodiment of the present invention.
Figure 13:
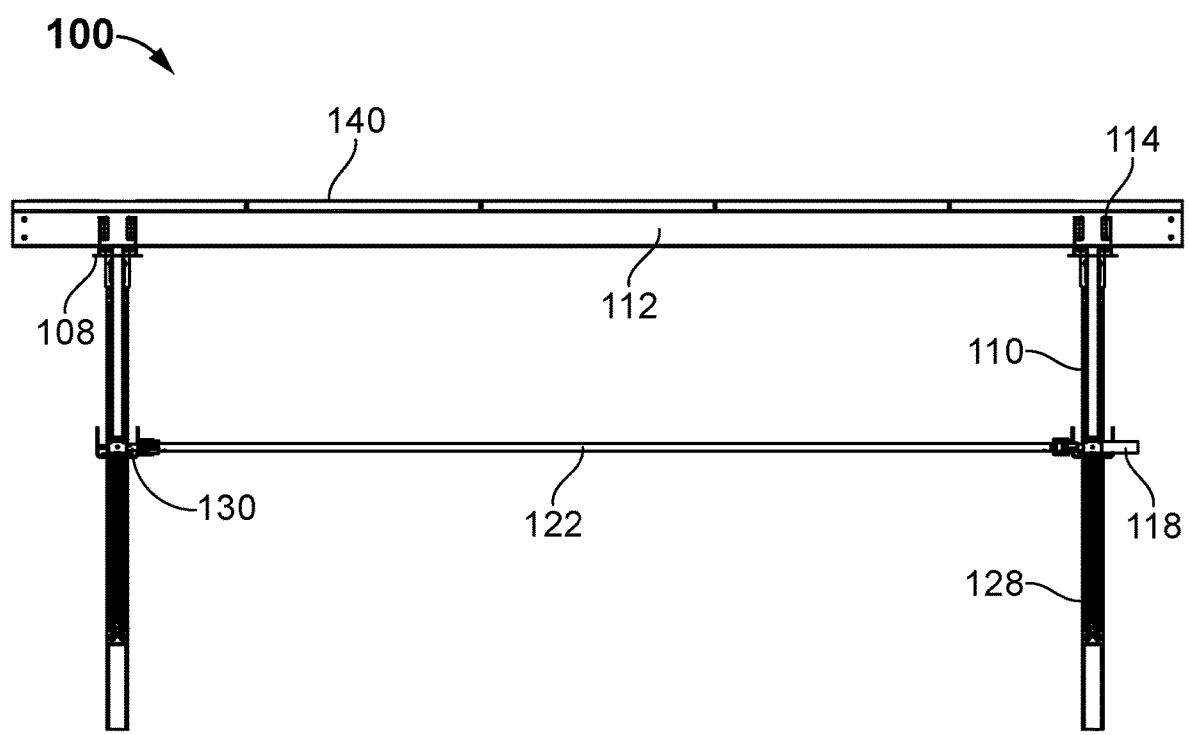
FIG. 13 shows a front view of the system in yet another embodiment of the present invention.

Referring to FIGS. 12 and 13, a side view and a front view of the system 100 respectively, according to yet another embodiment of the present invention. In one embodiment, the system 100 has two portrait configurations includes two-high module mounting configuration and fewer piles/drive assemblies per module, which is cost-effective. The system 100 comprises a pair of chord assembly 108, a kicker 110, a purlin assembly having one or more purlins 112 and one or more purlin hook 114, one or more motors 118, a driveshaft 122, an insertion rail system 124, a guide rail 128, and a translating jack screw lift assembly 130.

Figure 14:
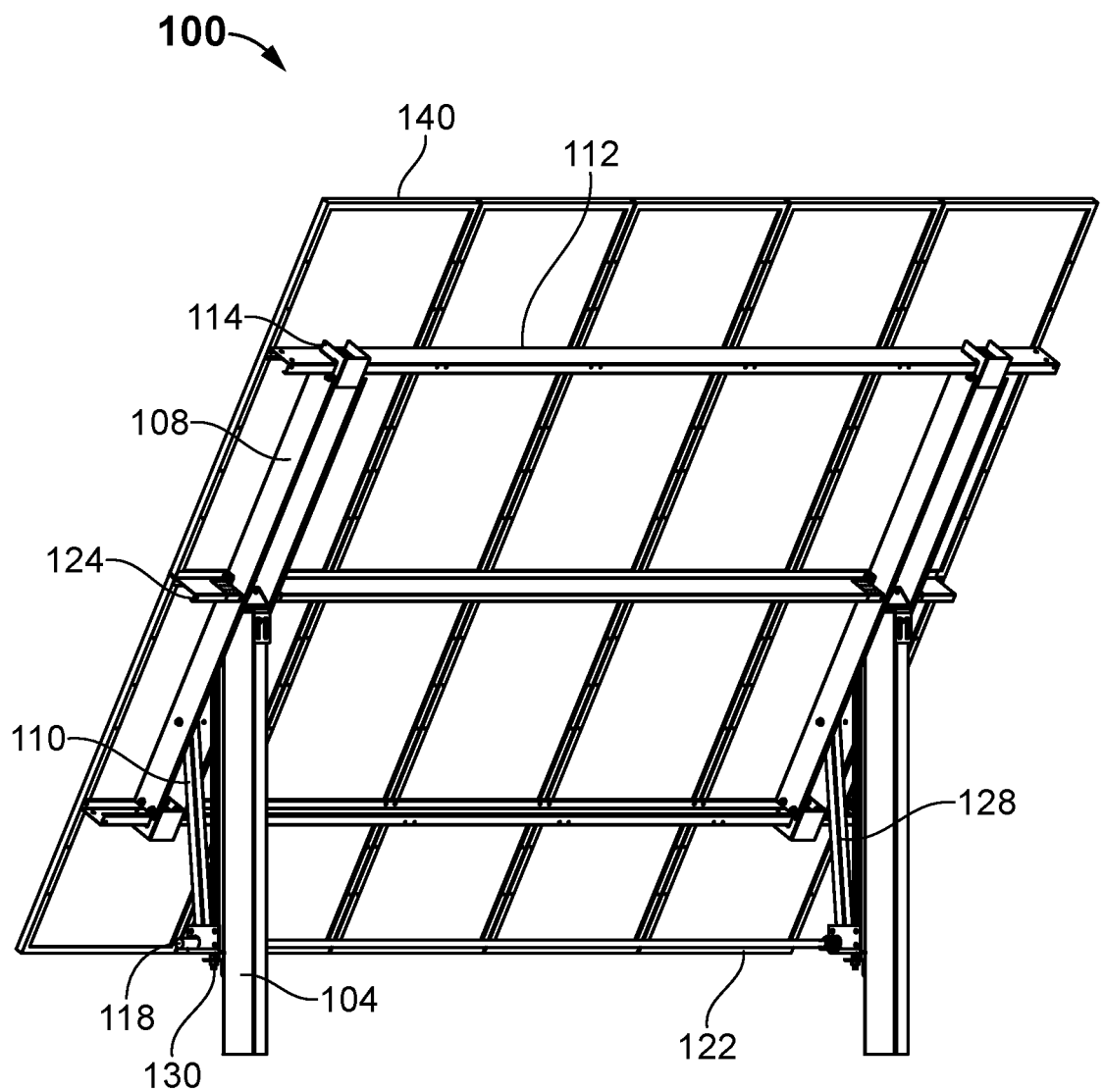
FIG. 14 shows a perspective view of the system tilted to a certain angle in yet another embodiment of the present invention.

In one embodiment, the translating jack screw lift assembly 130 is an industry-standard translating jack screw lift to translate vertically along the guide rail 128. In one embodiment, each pile 104 has one translating jack screw lift assembly 130. The translating jack screw lift assembly 130 is mechanically linked and driven via single row motor 118 and driveshaft 122. The translating jack screw lift assembly 130 lifts the mounting point along the guide rail 128 for kicker connection to rotate the system 100 to a desired angle. In one embodiment, the translating jack screw lift assembly 130 travels up and down with the kicker mounting position. FIG. 14 exemplarily illustrates a perspective view of the system 100 mounted with a plurality of solar panels 140 tilted to a certain angle using translating jack screw lift assembly 130, according to yet another embodiment of the present invention. Further, the translating jack screw lift assembly 130 reduces pile mounting surface space requirements.

Advantageously, the system is configured to provide various tilt angles throughout the day to track the sun. The tracking systems increase the solar energy output by about 20% throughout the day. The system utilizes traditional steel and aluminum structural components and geometry associated with low cost and rigidly fixed-tilt mounting structures. The system is powered via a self-powered auxiliary solar panel or connected to a fixed power source. Further, the controller unit attached to the tracker powers the motor and driveshaft lifting system that raises or lowers the mounting point of the kicker along the pile axis (vertically). Raising and lowering the mounting point of the kicker to pile alters the tilt angle of the system to track the sun. By utilizing a vertically actuating mounting point for the fixed length kicker at each pile, the system behaves as a stable fixed tilt system at all tracking angles. Further, there is no other tracker in the market that utilizes vertical actuation with fixed strut with a vertically variable mounting point to the pile. This solution provides a more rigid and stable mounting structure at a lower cost. An additional benefit is a structure does not require a stow angle under project loads. The system is effectively a tracking fixed tilt. The system may be configured to either a 1 portrait or 2 portrait tracking system. Also, the system may be used in any industry where a structural mounting point needs to move vertically to induce rotation.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A solar tracking mounting system comprising:
an anchor assembly comprising a pile and a riser bracket fastened to a top thereof, wherein the riser bracket is configured to provide adjustable mounting points;
a chord assembly coupled to the riser bracket, wherein the chord assembly is configured to pivotably tilt;
a kicker connected to the anchor assembly, wherein the kicker is configured to connect the chord assembly to the pile;
a vertical actuator connected to the kicker and the chord assembly, wherein the vertical actuator is a rack and pinion linear actuator configured to amplify a torque received from a motor and pivotably tilt the chord assembly to a desired angle while tracking a direction of a light source; and
a driveshaft connected to the motor and the vertical actuator.

2. The system of claim 1, further comprising:
at least one module rail coupled to the chord assembly, wherein the module rail is a purlin;
at least one purlin hook defined by a cutout in the at least one module rail, wherein the at least one purlin hook is configured to mount a plurality of solar panels to the chord assembly via bolting or clamping;
an insertion rail configured to clamp two purlins in place at a center span of the chord assembly.

3. The system of claim 1, further comprising a guide rail connected to the chord assembly and configured to lift the chord assembly along the guide rail to connect the kicker thereto.

4. The system of claim 1, wherein the riser bracket is configured to provide a plurality of mounting points for a component and is configured for installation adjustment of vertical, horizontal, and polar axes to align a panel row in vertical, horizontal, and polar axes.

5. The system of claim 1, wherein the chord assembly is mounted to the riser bracket using one or more fasteners.

6. The system of claim 1, wherein the kicker is a fixed length axially loaded strut that connects the chord assembly to the pile via the rack and pinion linear actuator, wherein the rack and pinion linear actuator comprises a pinion gear.

7. The system of claim 2, wherein the chord assembly is fastened to the purlins via self-drilling screws and bolts.

8. The system of claim 6, wherein the rack and pinion linear actuator is attached to the pile and comprises a fixed rack gear that is toothed or punched to accept a mating pinion gearbox, and is configured to linearly guide the pinion gear in a vertical motion during actuation.

9. The system of claim 1, further comprising a controller in communication with the motor and configured to implement a tracking schedule via an internal tilt sensor and backtracking to reduce module shading and energy loss.

10. The system of claim 8, wherein when the kicker is pinned to the rack and pinion linear actuator and chord assembly, when actuated, the kicker is paired with the pinion gear to allow for a structural connection at any tilt angle.

11. The system of claim 1 wherein the driveshaft is a torsionally stable beam.

12. The system of claim 1, wherein a load is transferred from the kicker to the pile via a distributed load from a contact surface between the guide rail and the pile.

13. A solar tracking mounting system, comprising:
an anchor assembly comprising a pile and a riser bracket fastened to a top thereof, wherein the riser bracket is configured to provide adjustable mounting points;
a chord assembly coupled to the riser bracket, wherein the chord assembly is configured to pivotably tilt;
a kicker connected to the anchor assembly, wherein the kicker is configured to connect the chord assembly to the pile;
a vertical actuator connected to the kicker and the chord assembly, wherein the vertical actuator is a jack screw lift assembly configured to pivotably tilt the chord assembly to a desired angle while tracking a direction of a light source;
a driveshaft connected to a motor and the vertical actuator.

14. The system of claim 13, further comprising:
at least one module rail, wherein the module rail is a purlin;
at least one purlin hook defined by a cutout in the at least one module rail, wherein the at least one purlin hook is configured to mount a plurality of solar panels to the chord assembly via bolting or clamping;
an insertion rail configured to clamp two purlins in place at a center span of the chord assembly.

15. The system of claim 13, further comprising a guide rail connected to the chord assembly and configured to lift the chord assembly along the guide rail to connect the kicker thereto.

16. The system of claim 13, wherein the riser bracket is configured to provide a plurality of mounting points for a component and allows for installation adjustment of vertical, horizontal, and polar axes to align a panel row in vertical, horizontal, and polar axes.

17. The system of claim 13, wherein the chord assembly is mounted to the riser bracket using one or more fasteners.

18. The system of claim 13, wherein the kicker is a fixed length axially loaded strut that connects the chord assembly to the pile via the jackscrew.

19. The system of claim 14, wherein the chord assembly is fastened to the purlins via self-drilling screws and bolts.

20. The system of claim 13, wherein the jack screw lift assembly is mechanically linked and driven via the motor and driveshaft and is configured to lift a mounting point of the kicker along the guide rail to connect the kicker to rotate the system to a desired angle.

\* \* \* \* \*